United States Patent

[11] 3,578,101

[72] Inventor Richard R. Larson
 Ulster Park, N.Y.
[21] Appl. No. 873,875
[22] Filed Nov. 4, 1969
[45] Patented May 11, 1971
[73] Assignee Hercules Incorporated
 Wilmington, Del.
 Continuation-in-part of application Ser. No.
 818,475, Apr. 21, 1969.

[54] CHARGE LOADER DEVICE, SYSTEM, AND METHOD FOR UNDERWATER SEISMIC EXPLORATION
 22 Claims, 8 Drawing Figs.
[52] U.S. Cl. ..................................................... 181/.5XC
[51] Int. Cl. ...................................................... F42d 3/06
[50] Field of Search........................................... 102/21,
 22—24; 86/20 (.5); 181/.5 (XC)

[56] References Cited
UNITED STATES PATENTS
3,360,070 12/1967 Cholet et al. .................. 181/.5(XC)
3,496,532 2/1970 Thigpen ........................ 181/.5(XC)

*Primary Examiner*—Verlin R. Pendegrass
*Attorney*—S. Grant Stewart

ABSTRACT: A device for loading small explosive charges for delivery to an underwater seismic shooting site over prolonged periods with greater regularity of sequence and higher rate of delivery than possible heretofore is provided which comprises a housing, and an open passageway extending therethrough and including a constricted throat portion and an adjacent frustoconical expansion section together with means for conveying fluid into the throat for generation of Venturi type pressure lowering as the source of suction force for drawing the small charges, inserted into the open passageway end, through the throat and expansion section for delivery to the site.

Method and system (1) for such loading of small charges, (2) for firing said charges and (3) for measurement of resulting seismic disturbances for a seismic record, are also provided.

RICHARD R. LARSON
*INVENTOR*

BY S Grant Stewart

ATTORNEY

RICHARD R. LARSON
INVENTOR

BY *S. Grant Stewart*

ATTORNEY

CHARGE LOADER DEVICE, SYSTEM, AND METHOD FOR UNDERWATER SEISMIC EXPLORATION

This application is a continuation-in-part of my copending application Ser. No. 818,475 filed Apr. 21, 1969.

This invention relates to a device for sequentially loading small explosive charges for delivery to an underwater seismic shooting site. In one aspect this invention relates to a system, including such loader device, for loading small explosive charges for delivery to an underwater seismic shooting site; and, in another aspect, to system for loading the charges and delivery and firing of same for generation of seismic energy in the underwater seismic test area. In another aspect this invention relates to a method for loading small charges for delivery to an underwater seismic shooting site; and, in a further aspect, to a method for loading the charges and delivering and firing same for generation of seismic energy in the test area. In still other aspects, this invention relates to seismic exploration method and system above referred to for loading, delivering and firing the charges, and measuring the resultant seismic energy for a seismic record. Other aspects will be apparent in light of the accompanying disclosure and the appended claims.

Seismic exploration involves the introduction of energy into the earth to initiate wave action for determination of subsurface structure characteristics, and is based on the generation of seismic disturbances, or waves, in the earth's surface which are reflected or refracted from varied strata interfaces and the like.

In off-shore seismic exploration, utilizing an explosive as the energy source, general technique has involved assembly of the charge on deck of a boat moving through the seismic test area and emplacement of the assembled charge from the moving boat. Until recently, large seismic charges of both the high explosive and nitrocarbonitrate (NCN) type, often in the order of from 25 to 50 pounds, have been utilized. However high explosives of any size are often unsuitable from the standpoint of fish kill and safety hazards involved and, even large NCN charges have, at times, presented serious fish kill problems. Further, the larger charges, upon detonation, have often imparted damage to the adjacent immersed seismic test equipment; and on-deck manpower, and storage, requirements have been high. Consequently, the industry has turned to the use of small seismic charges, generally NCN's of say from one-half to 4 pounds.

As will be readily appreciated, the use of such small charges as compared with that of the larger charges has required emplacement and detonation of a proportionately larger number of charges in a given test area which in turn has required emplacement and shooting of charges more rapidly than required in earlier practice.

In the copending U.S. applications Ser. Nos. 673,594 filed Oct. 9, 1967, and now abandoned, 724,942 filed Apr. 29, 1968, parent 818,475 filed Apr. 21, 1969, and now Pat. No. 3,509,820 and 818,476 filed Apr. 21, 1969, are disclosed seismic exploration systems utilizing small explosive charges, as a seismic energy source, in conjunction with underwater firing and associated charge loading means.

Heretofore a conventional breech type device has been utilized in the systems of the above referred to copending applications, for loading the charges for delivery to the firing station. One such breech type loader has been a chamber open at one end and having a quick acting inlet valve at the other end, and a hinged top. In the operation of that device it is generally required that one operator man the valve to regulate water flow into, and through the chamber and that another operator open the hinged top, insert the charge and close the top to thus synchronize operation of the chamber top and insertion of the charge with alternate closing and opening of the valve for regulation of water ingress as a driving force for moving the charge from the chamber for delivery to the firing device. Accomplishment of acceptable loading utilizing that particular mechanism requires the carefully coordinated action of two operators, nevertheless with limitations in loading rate and regularity of loading sequence. Another such conventional breech type loading system has been proposed, in which two chambers are connected in parallel in a water stream, and a single cross slide, containing two holes, extends across the two chambers so as to alternately position one hole, or passageway, in one chamber to admit water flow therethrough while the other passageway is outside the other chamber with the slide in closing relationship therewith. In this manner, the slide is operated to alternately close one chamber, and open the other, to facilitate alternate loadings for delivery of the charge to the shooting site. Such loading device requires an assembly of moving parts, water seal maintenance, remote power for operation of the slide system, all with attendant disadvantages in respect of rate and regularity of loading sequence.

This invention is concerned with a loader assembly, or device, for sequentially loading small explosive charges for delivery to an underwater seismic shooting site, and which operates without moving parts and can be operated by one operator over a prolonged period with markedly greater regularity of sequence and higher rate of delivery than possible heretofore. The invention is also concerned with method, and system, for loading the charges, and in separate embodiments, for delivery and firing the loaded charges, and for measuring the resultant seismic energy—each system containing a loader device of the invention.

In accordance with the invention, a device is provided for sequentially loading small explosive charges for delivery to an underwater seismic shooting site, comprising a housing; a passageway extending through said housing for successively conveying said charges, and said passageway having a constricted cross section along part of its length, as a throat portion; a section of said passageway diverging from said throat portion; and means for conveying fluid into said throat portion and for passing same through said throat portion under high velocity conditions in a direction toward said diverging section.

The cross-sectional dimensions of the passageway are predetermined for conveying the small charges through it for delivery to the shooting site. By way of example, the small seismic charges presently utilized are generally cylindrical and have a length in the order of from about 4½ to 5 inches and a diametric cross section of from about 2 to 2½ inches. The throat portion of the passageway is generally cylindrical and is often from about 2¼ to 6 inches in length by about 2¼ to 2½ inches in diameter, and the diverging section is a frusto cone of from 12 to 13 inches in length having an angle of divergence of from about 1¾ to 2° half angle. Any remaining, and rearward most section, of the passageway, which serves as a "-port," or a receiving zone, is any suitable dimension for receiving the charge assemblies for travel to the throat.

The above described means for conveying fluid into the throat section can be a plurality of separate passageways extending through the housing wall and into open communication with the throat section on the throat periphery. However now preferred, and described more fully with reference to the drawings herein, is an open channelway extending along the entire periphery of the throat portion. The fluid delivery capacity of the channelway is generally variable for any given loading.

The loading assembly is operated by passing a suitable fluid into the throat portion at sufficiently high velocity to concurrently generate a Venturi effect within the throat, with accompanying reduction in pressure therein. The reduced pressure thus generated in the throat creates a force of suction through the upstream end of the throat such that when the explosive charge is inserted into the throat, upstream from the point of fluid ingress, it moves into the throat in response to that suction force, i.e. the pressure differential between that outside the throat and the throat interior, to thus move into the throat and into the path of the forwardly moving high velocity fluid. In this manner, the high velocity moving fluid impinges against the charge assembly moving through the throat to thus provide further force for moving the charge in entrainment with the forwardly moving fluid, into the diverging, or expansion, section of the passageway wherein, due to the lowered water velocity, the pressure is correspondingly higher for discharge of the water, and charge carried therein, for delivery to the shooting site.

Further, in accordance with the invention, a system, including a charge loader device of the invention, is provided for loading seismic charges for delivery to an underwater firing station, which comprises a charge loading station remote from said firing station, and a seismic explosive charge loader assembly at said loading station; said loader assembly comprising (1) a housing, (2) a passageway extending through said housing for successively conveying said charges, and said passageway having a constricted cross section along part of its length, as a throat portion, (3) a section of said passageway diverging from said throat portion, (4) means for conveying fluid into said throat portion and for passing same through said throat portion under high velocity flow conditions in a direction toward said diverging section, and (5) means for communicating said passageway through said diverging section with conduit means for delivering explosive charges from said loader assembly to said firing station; and means for delivering water, as said fluid, through said conveying means for said flow through said throat.

The invention further provides a system for underwater seismic shooting utilizing small explosive charges as the seismic energy source and including a charge loader device of the invention, which comprises a submersed firing station for firing said charges; a seismic charge loader remote from said firing station and comprising (1) a housing, (2) a passageway extending through said housing for successively conveying said charges, and said passageway having a constricted cross section along part of its length, as a throat portion, (3) a section of said passageway diverging from said throat portion, and (4) means for conveying fluid into said throat portion and for passing same through said throat portion under high velocity flow conditions in a direction toward said diverging end; means for delivering fluid through said conveying means for said high velocity flow; conduit means connecting the diverged end of said diverging section of said passageway with said firing station for conveying said charges from said loader device to said firing station; and means at said firing station for firing said charges to provide said seismic energy.

Further in accordance with the invention a method for sequentially loading seismic explosive charges at a charge loading station in a marine seismic area, for delivery to an adjacent underwater seismic shooting site, is provided which comprises pumping water from the marine area at high flow velocity through a throat-way supported at said station in direct communication at one end with atmospheric air, and then passing said water into and through a diverging zone of expansion, whereby the pressure in said throat becomes less than that of the surrounding atmospheric air and air is drawn from the adjacent atmosphere into said throat through said open end; sequentially inserting said charges from the adjacent air atmosphere into said open end of said throat-way, whereby said charges are moved into an initial zone in said throat-way for force of air drawn from the adjacent air atmosphere and then through the remainder of said throat-way and through said diverging zone under combined force of atmospheric pressure and impinging force of said water for delivery, entrained in said water, to said shooting site.

The invention further provides a seismic exploration method for sequentially loading seismic explosive charges at a charge loading station in a marine area and delivery of the charges to an underwater shooting site and firing same to provide seismic energy for a seismic record, which comprises pumping water from the marine area at high velocity through a throat-way supported at said station in direct communication at one end with atmospheric air, and then passing said water into and through a diverging zone of expansion, whereby the pressure in said throat becomes less than that of the surrounding atmospheric air and air is drawn from the adjacent atmosphere into said throat through said open end; sequentially inserting said charges from the adjacent air atmosphere into said open end of said throat-way, whereby said charges are moved into an initial zone in said throat-way by force of air drawn from the adjacent air atmosphere and then through the remainder of said throat-way and through said diverging zone under combined force of atmospheric pressure and impinging force of said water for delivery, entrained in said water, to said shooting site; delivering said charges from said diverging zone to said shooting site, and then firing said charges to provide said seismic energy.

The invention is further illustrated with reference to the drawings of which

Figure 1:
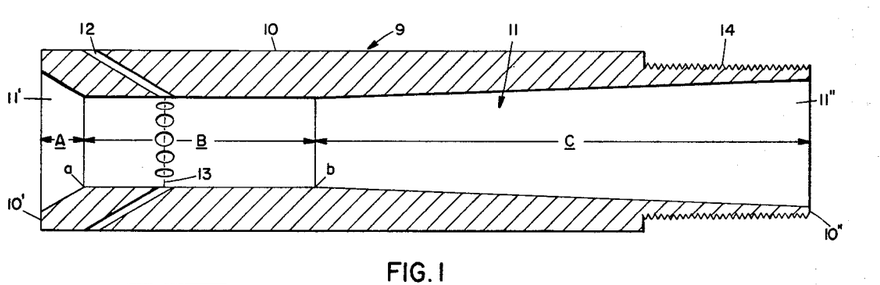
FIG. 1 is a cross-sectional view of one embodiment of a charge loader assembly of the invention.

Referring to FIG. 1, housing 10 of seismic charge loader 9, contains elongated passageway system 11 extending therethrough and open at both ends, viz. rearward end 11' and forward end 11'', and having a constricted cross section along part of its length as a throat portion, viz. throat B described hereinafter.

Passageway 11 contains sections A, B and C coaxially disposed in series for conveying small seismic charge assemblies for delivery to the shooting site. Intermediate passageway, portion, or section, B is generally of circular cross section and serves as a throat member for sequentially conveying the explosive charges, as more fully described hereinafter; forward end section C is frustoconical and diverges from the periphery of throat portion B at the forward end $b$ thereof, toward, and through, the forward end 10'' of housing 10; and rearward end section A diverges from the periphery of throat section B at the rearward end $a$ thereof toward, and through, the end 10' of housing 10.

Section A, as a "port," or charge receiving zone, can be of any suitable length to facilitate direction of the seismic charges from outside housing 10 through section A and axially into throat B; and throat B and diverging end section C are of any suitable length to facilitate sequential travel of the charges through the remaining sections B and C for delivery to the shooting site. Generally the length of section C is in a ratio to the diameter of throat B of at least 5:1.

A plurality of conduits 12 extend angularly, say at an angle of from 10° to 20° with the passageway 11 axis, through a sidewall of the housing into direct open communication with the throat B in a direction toward discharge section C. Conduits 12 open into throat B along a peripheral path 13 (dotted line) on the housing inner wall around throat B, intermediate the forward and rear ends thereof. Although any suitable number of openings 12 can be utilized, it is generally advantageous that the number of conduits 12 is such that the openings, on the peripheral path 13, are not apart by more than one to three passageway 12 widths. Conduits 12 are adapted to be in open fluidtight communication with a high pressure fluid source for conveying fluid into throat B as a plurality of high velocity streams in a direction toward discharge section C.

In the operation of loader assembly 9, a fluid stream is injected at high velocity through each of the conduits 12 into throat B in a direction toward, and through end section C to thus cause a Venturi type reduction in pressure in throat section B to a level below that outside housing 10 to generate a "suction" force in throat B drawing air from the outside of housing 10 through section A. The fluid injected from conduits 12 into throat B flows into discharge section C wherein the velocity energy of the fluid-air mixture is converted to increased pressure, and from section C through opening 11", and into a suitable conduit (not shown) threadably secured (threads 14) to the forward end of housing 10.

In preferred practice, the loader assembly is operated as a component of a system, on deck of a tow boat moving through the seismic area. Water, as the fluid introduced through conduits 12, is pumped from the adjacent water body in the seismic area, to the boat deck and through conduits 12. Air is drawn from the atmosphere through the port section A by force of suction in throat B. It is necessary that the flow velocity of the water through conduits 12 by regulated to provide the desired air to water ratio in throat B, for the desired degree of suction force in section A, which in turn draws air from outside the housing as a force for driving the added charges through section A and into the lowered pressure zone in throat B. Whether the amount of suction force is sufficient to draw each charge entirely through section A or draw it into throat B only after the charge has been inserted in a forward part of section A, depends on the air to water ratio utilized. In any event, when the charge is drawn past the water ingress points on the inner wall of housing 10, i.e. path 13, it is impinged by the incoming streams and thus additional force resulting from the impingement serves as further driving force for moving the charges into the expansion chamber, or section C, which converts the velocity energy of the water to higher pressure energy for discharge from housing 10.

Housing 10 can be connected at the forward end 10" by threads 14 with a suitable delivery hose, or conduit, for accepting the entire water-air mixture and seismic charge entrained therein, from forward section C for delivery to the underwater shooting site.

The loading device of FIG. 1 is readily operated by one operator who can merely insert the charges in section A of the device, which will then travel through throat B and section C for delivery to the firing zone. No moving parts, seals, or additional operating manpower are required and hence the charges can be sequentially delivered from the assembly 9 at a high degree of rate, and regularity of sequence, to provide for loading markedly improved over that accomplished heretofore.

Figures 2, 2A, 3:
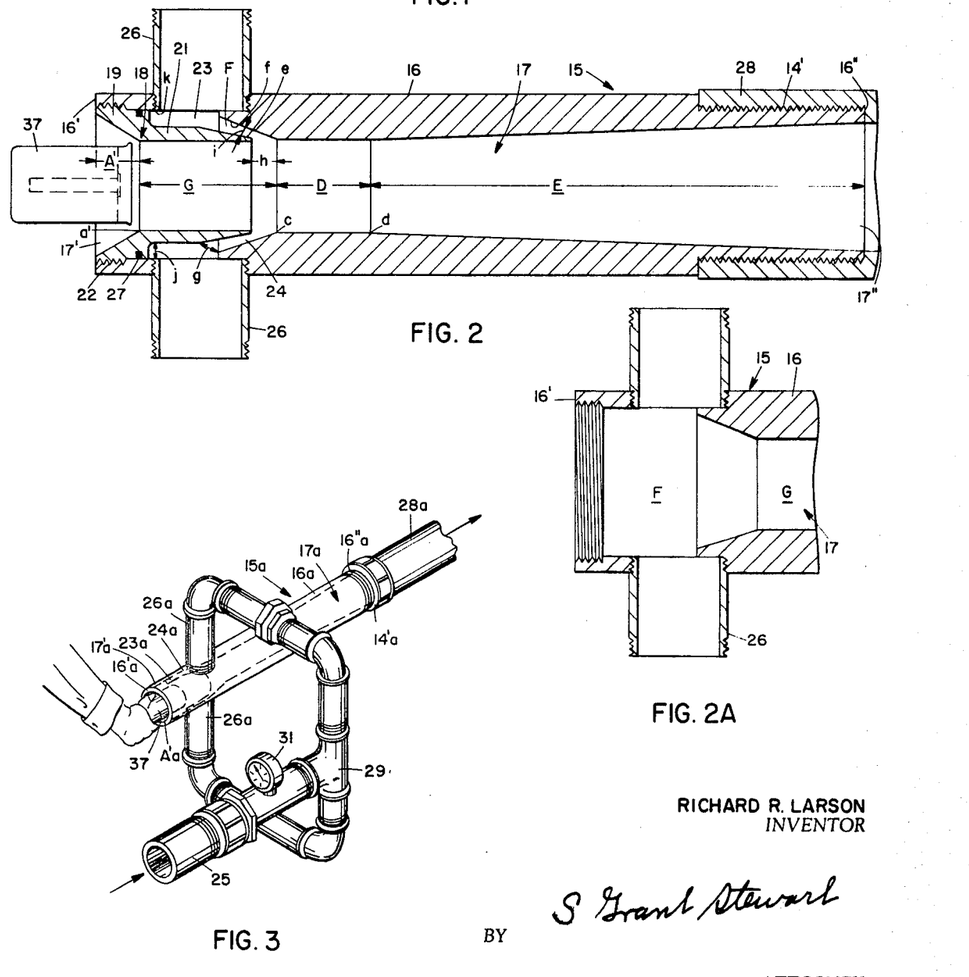
FIG. 2 is a cross-sectional view of a now preferred form of charge loader assembly, including channelway means for admitting fluid under high velocity into the throat section and means for varying the fluid delivery capacity of the channelway.
FIG. 2A is the same as FIG. 2 except that it is devoid of the channel, and associated structure of FIG. 2.
FIG. 3 is a view, in perspective, of a loader assembly of the invention, and auxiliary equipment, for operation on a seismic boat deck.

In a now preferred embodiment of loader assembly, in accordance with which rate of flow of fluid into the throat can be adjusted during the loading operation, or alternatively can be readily adjusted between loading operations, is shown with reference to FIG. 2. Referring to FIG. 2, elongated housing 16 of loader assembly 15 contains elongated passageway system 17 extending therethrough in direct open communication with the outside of housing 17 at rearward and forward housing ends 16' and 16" contains constricted cross section parts G and D as a throat portion, or section. Thus, passageway 17 comprises forward part D of an overall throat portion, generally of circular cross section, formed as described hereinafter; forward end section E diverging from the periphery at the forward end d of throat part D toward and through the forward end 16" of housing 16, and rearward most section F diverging from rearward end c of throat part D for a predetermined distance toward housing end 16' and then at substantially constant cross section through housing end 16'. Rear section F of passageway 17 is more clearly illustrated with reference to FIG. 2A which shows a rearward most portion of loading assembly 15 including the entire passageway section F extending rearwardly from throat part G through housing end 16'; all parts shown in FIG. 2A being like parts of FIG. 2 and accordingly designated by the same index numbers.

Again referring to FIG. 2, bushing assembly 18, coaxially within passageway section F of housing 16 includes bushing member 19 and collar-type member 21, annularly disposed in section F to form annulus 23, forwardly extending from the forward end of bushing 19 toward, but short of, closing contact with throat part D to form throat part G, and, together with throat part D, forming a resulting overall throat portion G plus D. Annular space 23 around collar member 21 is formed by the exterior wall of extended collar member 21 and an inner wall portion of housing 16. Spacing of collar member 21 from throat part D provides intermediate, and continuous open and unobstructed channelway 24 opening from annular space 23 into throat portion D and hence into an intermediate portion of the overall throat section, G plus D, entirely about the periphery thereof. The wall portions $f$ and $e$ forming channelway 24 extend codirectionally, and often in substantially parallel relationship so as to angularly open channelway 24 into the throat portion (G plus D) in a direction toward diverging end section E. In practice, wall portions $f$ and $e$ are formed by appropriate beveling of the walls of housing 16 and collar 21 as shown. Fluid inlet conduits 26 extend from outside housing 16 through a sidewall thereof into direct and open, fluidtight communication with annular space 23. Channelway 24 opens into throat G plus D angularly and toward section E in the same manner as described above with reference to conduits 12, FIG. 1.

Bushing member 19, which forms port section A' is secured in fluidtight relationship with housing wall 16 by suitable O-ring 27 and threads 22. The capacity of channelway 24, as a function of the width thereof is varied, as desired, by threadably moving bushing assembly 19 axially toward or away from throat part D on seal 27.

Housing 16 is adapted to be threadably connected (threads 14') at the downstream end with a suitable delivery conduit 28.

FIG. 3 is a perspective view of the loader assembly of the invention, and associated structure for operation on deck of a boat moving through the seismic test area, and is illustrated with specific reference to the loader assembly of FIG. 2 which is now preferred. All parts in FIG. 3, which are like parts of FIG. 2 are designated by the same but lettered index numbers. Referring to FIG. 3, conduit, or hose, 25 connects with T-type manifold 29 for delivery of water pumped to the boat deck from the adjacent marine area. Manifold 29 connects at each end of the T with a conduit 26a each of which discharges into the reservoir 23a at points spaced apart about 180°. Gauge 31 in line 25 records the pressure on the manifold, which in conjunction with the preset capacity of channelway 24a continuously indicates the pressure of water delivered through the channelway 24a into the throat (G plus D, FIG. 2). Housing 16a is threadably connected at forward end 16"a via threads 14a with delivery conduit 28a leading to the underwater firing site.

In the operation of the loader assembly 15a water is pumped from the adjacent marine area via line 25 through manifold system 29 into lines 26a, reservoir, or jacket 23a, channelway 24a and into and through the throat and expansion section for discharge through conduit 28a. A small cylindrical seismic charge assembly 37 (see FIG. 4) can be hand inserted, or merely placed, in the rear, or port, section A'a of housing 16a after which the charge assembly is driven into the rearward end of the throat (G plus D) under force of atmospheric air drawn into passageway 17a through housing end 16'a. The charge assembly 37 is driven into the throat past the ingress points of water from channelway 24a and is then impinged by the moving high velocity water so that, with benefit not only of the air pressure differential but also the additional force of impingement, the charge assembly is driven through the throat into the diverging, or expansion chamber 17a for discharge into hose 28a for delivery to the shooting site.

As shown, there are no moving parts in the loading assembly and only one operator is required. Operation involves only the regulation of velocity of the water flow from channelway 24a into the throat and sequential emplacement of the charges in the port section for rapid loading into the conduit for delivery to the firing station.

If the water velocity through channelway 24 is relatively low the ratio of air to water in throat portion G plus D is lower than when the flow velocity of water into the throat section is higher. At the higher air to water ratios the operator need only insert the charge in the housing opening and sufficient suction force is available to promptly draw the charge into the throat and cause it to travel rapidly for discharge into the delivery hose. On the other hand when a low ratio of air to water is utilized, the force of suction is correspondingly lower and it is then generally necessary that the operator manually insert the charge into the throat to a point closer to the zone of ingress of the water to accomplish the desired loading rate.

Figures 4, 6, 7:
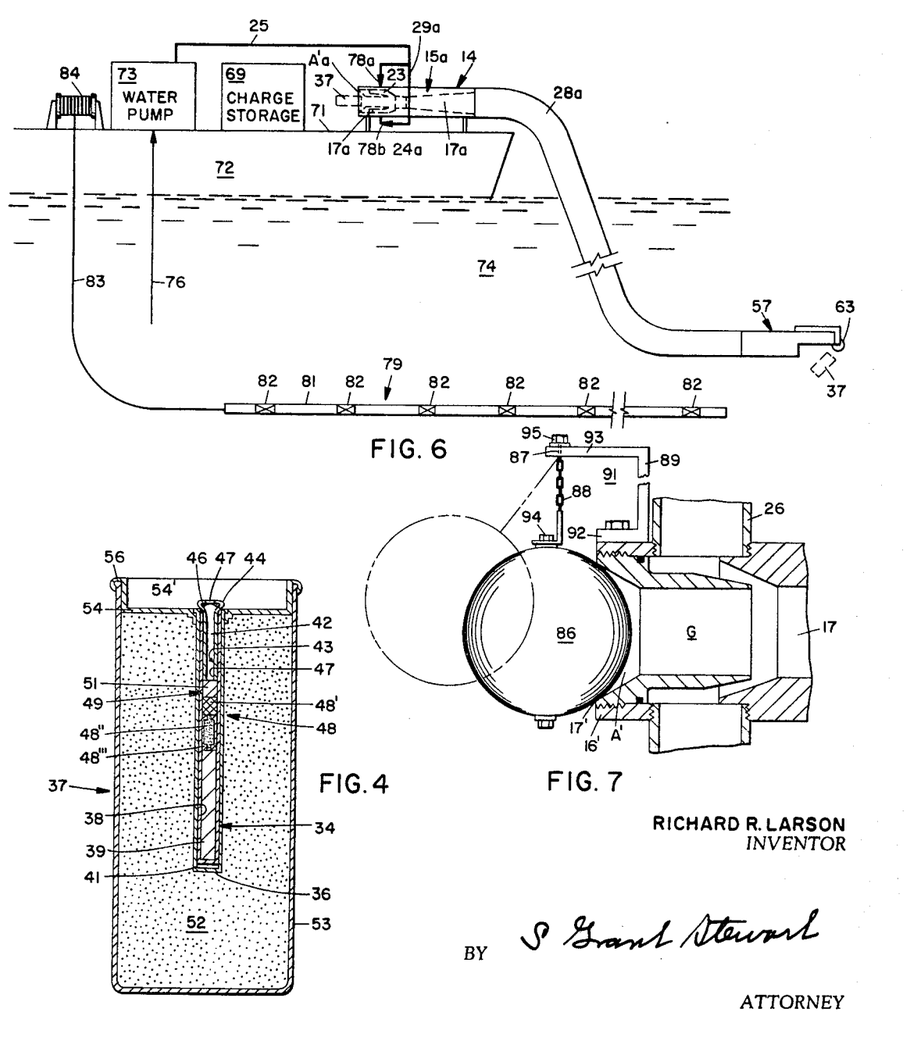
FIG. 4 is a cross-sectional view of one form of small seismic charge assembly loaded for firing in accordance with the invention.
FIG. 6 is a diagrammatic illustration of seismic loading, and exploration systems of the invention including, as now preferred, a loading device of FIG. 2, and a firing device of FIG. 5.
FIG. 7 is a partial view of a loading device of FIG. 2 and associated port closure means for precluding suction of air into the throat of the device during continued operation of same between loading periods. The drawings further illustrate method of the invention.

A small seismic charge often loaded for delivery to the firing device, and fired, in accordance with the invention is in one embodiment, that shown in FIG. 4 and disclosed in my parent application Ser. No. 818,475 filed Apr. 21, 1969, referred to hereinabove; and which is a complete percussion initiatable assembly containing a delay fuse and a rim-fired rifle cartridge casing closure as the percussion sensitive portion. Referring to FIG. 4, primer assembly 34 extends into primer well 36 of complete seismic charge assembly 37. In primer 34 elongated shell 38 contains a high explosive charge 39 such as PETN, adjacent closed end 41. Ignition end 42 of shell 38 is closed by conventional rim-fired empty primed rifle cartridge casing 43 which includes end closure 44 with charge 46 for rim firing, and casing portion 47; and the outside diameter of casing portion 47 and the inside diameter of shell 38 are adjusted to provide an interference, or friction, fit of the casing closure in the primer shell.

Confined ignition charge 46 is any suitable ignition composition which ignites to produce a flame in response to compression resulting from percussion applied to the outer surface 47 of closure cap 44. Primer assembly 48 in shell 38 is any suitable assembly of primer composition, intermediate high explosive charge 39 and ignition charge 46. Delay fuse assembly 49 containing slow burning delay fuse composition 51 is of the type conventionally used as a delay element in electric delay blasting caps and is disposed intermediate the primer assembly 48 and ignition 46. Delay composition 51 is ignitable in response to direct contact with flame emitted from ignition of charge 46 and is spaced in such ignitable relationship therewith. The primer composition of assembly 48 is ignitable (48') and detonatable (48") in response to heat and flame emitted from burning of delay fuse composition 51 and is disposed adjacent to delay fuse composition 51 in such igniting and detonating relationship therewith. High explosive charge 39 is detonatable in response to detonation of the primer charge of assembly 48 and is disposed adjacent the assembly 48 in that detonating relationship.

Primer charge assembly 48 and base charge 39 are advantageously those utilized as such in the blasting cap art, exemplary of which are high explosive base charges 39 including pentaerythritoltetranitrate, pentolite, RDX and the like, and primer charges such as diazodinitrophenol, lead azide, and mercury fulminate. Exemplary confined ignition charge 46 components include potassium perchlorate, lead stiffnate, mercury fulminate, antimony sulfide and lead azide and mixtures of such materials as are well known in the munitions art, and are preferably those often utilized as a "primer" charge in 0.22 caliber rifle cartridges. Delay fuse compositions 51 include those normally utilized as such in the delay blasting cap art, those now preferred including lead oxide/boron, 98/2; read lead/boron, 98/2; barium peroxide/tellurium/selenium, 40/40/20; barium peroxide/selenium, 84/16; barium peroxide/tellurium, 60/40 and the like.

The primer assembly 48 in preferred practice comprises a diazodinitrophenol wafer 48' pressed above, and superposed, on elongated capsule 48''' which extends within and is substantially coaxially with shell 38 in closing, or near closing relationship therewith. Capsule 48''' is open at each end and is superposed on base charge 39 and contains a second diazodinitrophenol charge 48'' of density lower than that of primer wafer 48'. Wafer charge 48' is of sufficiently high density to be ignitable in response to heat and flame from ignition of delay fuse composition 51 and diazodinitrophenol charge 48'' is of sufficiently low density to be detonatable in response to heat developed by ignition of wafer charge 48' to thereby in turn cause detonation of base charge 39.

Primer assembly 34 extends into well 36, percussion end 44 last, and it terminates in detonating contact with main charge 52 in cartridge shell 53 of the complete assembly 37. Primer device 34 is preferably disposed entirely within shell 53 except to permit the primer end closure 44 at its outside surface 47 to be at least flush with the exterior surface of well 36 at the open end thereof and preferably to permit both the top surface 47 and the ignition end 46 portions to protrude from well 34 into the top recessed shell portion 54'.

Recessed shell portion 54', formed by spacing shell top closure 54 downwardly from topmost end, or rim 56 of shell 53 is optional but, by its extending wall members, provides protection against undue impact of the percussion sensitive portion of the cartridge assembly 37 during handling prior to shooting.

The primer element 34 is generally cylindrical and often is from about 2¼ to about 3 inches in length by about 0.246 to 0.248 inch in diameter.

Further exemplary of a now preferred complete seismic charge assembly, including an NCN type main explosive charge, to be loaded for delivery to the underwater firing site, in practice of the invention, is that illustrated in the following list of specifications with particular reference to the assembly of FIG. 4.

Primer unit:
    Metal shell 38—Metal, cylindrical:
        Length, inches—2.98
        Diameter, inches:
            Inside—0.22
            Outside—0.24
    Ignition end closure 47—Empty, primed rim-fired cartridge case for 0.22 cal. short ammunition.
    Delay fuse assembly 49:
        Fuse powder, $BaO_2$/Te/Se/Pb-Sn (32/32/16/20*)
            Pressed, p.s.i.—6,000
            Grams—0.4
            Length, inches—0.16
            Diameter—0.22
            Space from ignition end, inches—0.43
    Primer-ignition 48:
        Diazodinitrophenol, grams—0.29
            Above capsule (48')—Pressed at 5,000 p.s.i.
            Below capsule (48")—Loose.
    Base charge 39, PETN, grams—1.5 (pressed at 6,500 p.s.i.).

Cartridge unit:
    Metal shell 53—Cylindrical:
        Length, inches—4.68
        Diameter, inches:
            Inside—2.04
            Outside—2.09
    Recess 54', inches, length—0.41
    NCN charge 52:
        Weight, grams—250
        Length, inches—3.27
        Diameter, inches—2.04
        Composition, wt. percent:
            Ammonium nitrate—78.7
            DNT—5.0
            Fuel oil—1.5
            Particulate aluminum—14.8

*Pb/Sn is 85/15.

Figure 5:
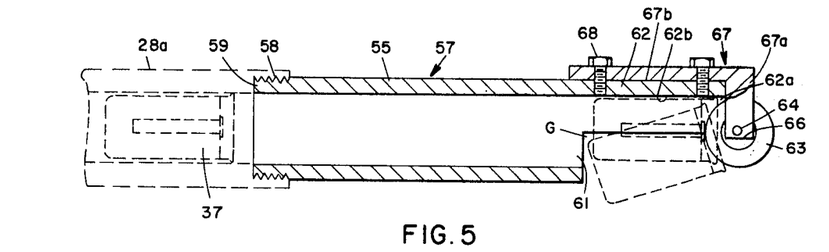
FIG. 5 is a cross-sectional view of one form of firing device, for firing seismic charges, loaded and delivered to the shooting site in accordance with the invention.

Exemplary of a suitable underwater firing device for receiving and firing seismic charges loaded in accordance with the invention, is that shown in FIG. 5 and disclosed and claimed in my copending parent application Ser. No. 818,475 above referred to; and further exemplary of suitable firing devices are a piston type assembly disclosed and claimed in the above referred to copending application Ser. No. 724,942 and an impact plate type assembly disclosed and claimed in the above referred to copending application Ser. No. 818,476.

Referring to FIG. 5, percussion initiated explosive charge assembly conveyor conduit 55 of firing device 57 is threaded (threads 58) at rearward end 59 for connection with a suitable hose type delivery conduit 28a (FIG. 3) for sequentially receiving elongated delayed percussion initiatable seismic charge assemblies 37 (FIG. 4) from delivery hose 28a and then conveying them through forward end 61 for percussion initiation.

Open guide-support means 62 is a suitable tray-type member adjacent and immediately forward of conduit 55, and is in open communication and direct alignment with conduit 55 for sequentially receiving the delay type percussion initiatable seismic charge assemblies from conduit 55 as they are moved axially therefrom; and for guiding each charge assembly along a path of continuous forward travel to wheel type contact, or firing pin, means 63 at or near the forward end 62a of guide member 62. Guide member 62 is open for subsequent pivotal travel of the seismic charge assembly, described further herein.

Although tray-type guide member 62 and conduit 55 can be connected in any suitable manner, they constitute in preferred practice a single unit of integral construction, as shown. Thus in the embodiment shown, conduit 55 and guide member 62 as an integral unit can be fabricated by cutting a relief from one end of a tube, or pipe, member along a suitable circumference say of from about 180° to 300°. Regardless of whether conduit 55 and guide member 62 are of integral construction, guide member 62 is of shape and is secured to conduit 55 to sequentially receive the axially moving seismic charge assemblies from conduit 55 and guide them in a line of continued forward travel, maintained under force of fluid pressure in conduit 28a, toward wheel member 63. In a now preferred form, the inner wall 62b of guide member 62 is substantially coplanar with an adjacent inner wall portion of conduit 55 to facilitate travel of the seismic charge assembly from conduit 55 onto guide member 62.

Wheel member 63, in combination with guide member 62 is spaced from the forward end 61 of conduit 55 in a plane substantially codirectional with the path of forward travel of the seismic charge assembly on guide member 62; and is spaced from end 61 of conduit 55 so that the distance of its rim portion closest to conduit 55 is greater than the length of the particular seismic charge assembly, say from 1.1 to 1.3 times the length of the assembly, to provide a gap G between forward end 61 of conduit 55 and the rearward end of the seismic charge assembly when ready for pivotal travel from guide member 62 as described hereinafter.

Wheel member 63 is rotatably supported at its hub by support pin 64, secured to end 66 of L-shaped bracket 67 of which one leg 67a extends across the forward end of guide member 62 and the other leg 67b extends along the exterior wall of guide member 62 and is secured thereto by screw bolt members 68. Wheel member 63, when supported as above described, is disposed across the forward end of guide 62 sufficiently to intercept the forward travel of the seismic explosive charge assembly on member 62 and contact a portion of its rim, facing conduit 55, with a percussion sensitive portion of the charge assembly, for effecting percussion initiation of the charge. Wheel 63 is advantageously of diameter sufficient for it to extend across the entire projected end of conduit 55. However the total shadow area of wheel member 63 and its associated support structure including arm 67a, i.e. the total area filled by that combined structure, is sufficiently limited to facilitate linear flow of water, or other driving fluid from conduit 55, around it to facilitate guidance and support of the charge assembly along its path of forward travel on guide member 62. Wheel member 63, and a percussion sensitive portion of the charge assembly are preferably positioned so as to be disposed in the central portion of the path of forward travel of the charge assembly.

Although the inside diameter of conduit 55 can be constant, it is often advantageous that at least a rearward most inner wall end portion thereof be tapered in a forward direction to facilitate arrest and positioning of the charge assembly for conveying it to the guide member 62. The tapered inner wall portion of conduit 55, when utilized, advantageously extends from rearward end 59 toward forward end 61 generally a distance of from about one-fourth to one-half the length of conduit 55.

A now preferred embodiment of underwater seismic exploration system utilizing a loading device of the invention, as a component, is diagrammatically illustrated with reference to FIG. 6. Referring to FIG. 6, charge assembly storage 69, on deck 71 of tow boat 72 provides for storage of percussion initiatable charge assemblies such as of FIG. 4. Charge assemblies from storage 69 are sequentially inserted in a loader assembly of the invention and can be adapted for electrical or nonelectrical firing, as desired, which in turn determines the particular firing mechanism utilized at the firing station. However a percussion initiatable type assembly such as illustrated with reference to FIG. 4 is now preferred in conjunction with a firing device for percussion firing the charge underwater, such as that of FIG. 5. Thus, percussion initiatable charges 37 (FIG. 4) are sequentially inserted, percussion sensitive end first, into passageway 17a of loader assembly 15a (FIG. 3) through the port section A'a concurrently with flow of water pumped by pump 73 from the adjacent body of sea water 74 via line 76 and discharged via line 25 and manifold 29a into annular reservoir, or jacket, 23a (FIG. 3) at points 78a and 78b, 180° apart, for discharge at high velocity via channelway 24a (FIG. 3) into the throat section (G plus D, FIG. 2). Charges 37 are thus, by force of air entering passageway 17a through the port end under atmospheric pressure, drawn into the throat section and into impinging relationship with the high velocity flowing water; and with additional force of resulting impingement they are moved into and through diverging, or expansion, end section Ea (FIG. 3) under accompanying increased pressure and into delivery conduit 28a (FIG. 3) for delivery to the underwater site for percussion initiation upon contact with the wheel assembly 63 (FIG. 5) and delayed firing outside the system for generation of seismic energy.

Thus, flexible hose 28a extends from the loader 15a to the firing mechanism 57 (FIG. 5) for sequential delivery of the percussion initiatable charges and firing, as the firing device is towed by boat 72 through the marine seismic area.

Streamer cable assembly 79, of conventional design, comprises a hydrophone cable 81 containing a plurality of hydrophone groups 82 integrally connected in spaced apart relationship along the entire length thereof, and is connected to one end by tow cable 83 to reel assembly 84 on the boat deck for reeling and towing. Suitable well known means (not shown) are associated with streamer cable assembly 79 to stabilize its position at a predetermined depth in the body of water; and suitable means (not shown) for communicating hydrophone groups 82 with recorder means on the boat deck, extend from within cable 81 along side tow cable 83 via reel assembly 84.

In practice, streamer assembly 79 is towed through the water body during which time the seismic charges are detonated outside the system at predetermined intervals, and distances, to initiate seismic shock at the predetermined points in the test area. Disturbances produced by the shot, or shock, are detected by the hydrophone groups which convert those pressure variations into electric signals which are then communicated to the boat for recording.

By way of further illustration of the system of the invention, a series of charges of FIG. 4 were sequentially loaded in a loading device of FIG. 2 when utilized as a component of a system of FIG. 6, associated with the auxiliary equipment shown in FIG. 6. The pressure differential between the outside of the loader and the throat section therein was about 14 p.s.i. At that high pressure differential, each charge was merely laid in the open port area of the loader, i.e. in end section 17' of passageway 17 (FIG. 2), as illustrated with reference to FIG. 3, and released. The force of air initially flowing under atmospheric pressure rapidly moved the seismic charges into the throat section; and, in conjunction with impingement action of the high velocity water entering the throat through the channelway 24, the charges accordingly moved into and through, the expansion member E into the hose 28 for delivery to the underwater firing device 57 of FIG. 6 at a depth of about 36 feet. Twenty seven individual loadings and subsequent shots were made, without a failure, within a period of 9 minutes by one operator positioned at the loading station to sequentially feed the charges into the port for the loading.

The following, further illustrative of the invention, is a tabulation of various component dimensions of the loader assembly of FIG. 2 utilized in the above series of tests:

|  | Inches | | | Angle of divergence from the longitudinal housing axis |
|---|---|---|---|---|
|  | Length | Diameter | Width |  |
| Housing 16 (circular cross section at outer periphery) | 18.5 | 5 (o.d.) | | |
| Throat (G plus D): | | | | |
|   Part G | [1] 2.625 | 2.250 | | |
|   Part D | 2.200 | 2.250 | | |
| Diverging Section E | 12.0 | | | 1°45′(½) |
|   At end 17″ | | 3.0 | | |
|   At throat end d | | 2.25 | | |
| Channelway 24: | | | | |
|   Housing wall e | 1.40 | | | 10° |
|   Housing wall f | 1.35 | | | 20° |
|   Variable opening g from annulus | | | 0.28–0.38 | |
|   Variable opening h into throat G plus D | | | 0.32–0.77 | |
|   Variable minimum i | | | 0.10–0.28 | |
| Port A′: | | | | |
|   At opening 17′ | | 3.548 | | 30 (½) |
|   At throat end a′ | | 2.250 | | |
| Conduits 26 | | 2 (i.d.) | | |
| Annulus 23: | | | | |
|   At rearward end j | | | 0.434 | |
|   Inlet side k | 1.55–1.97 | | | |

[1] Excluding channel opening b, which is a part of throat part G, but variable and described below.

In the operation of the loader assembly of the invention as it is towed through a seismic marine area, it is often advantageous from the operational standpoint to permit continuous flow of water into and through the loader assembly for discharge into the shooting area independently of whether charge loading is in progress. In this manner the need for operating steps involving alternate starting and stopping the water pumping system between loading periods is eliminated. However, during such nonloading periods there is often a resulting accumulation of air bubbles at the discharge end of the system, i.e. in the underwater shooting area, which, in some instances, may impair measurement of seismic disturbances resulting from subsequent shots.

It is therefore sometimes advantageous that flow of air to the loader device be eliminated, or substantially reduced, during any nonloading period of continued water flow, which can be accomplished by any suitable means.

One such means is illustrated with reference to FIG. 7 which shows a section of the loader device of FIG. 2, including port section A′, and a ball type assembly for closure of the port to eliminate flow of air into and through the loader device to the underwater shooting site in those instances in which operation of the water pumping system is continued during a nonloading period. All like parts of FIGS. 2 and 7 are designated by the same index numbers.

Referring to FIG. 7, elastomeric sphere, or ball, 86, outside housing 16 and having a diametric cross section greater than that of circular port opening 17′, is suspended from an external point 87 by suspension cord 88 so as to be in position for travel along an arc having support point 87 as a center, into and out of peripheral closing contact relationship with the passageway 17 at rearward opening 17′. Any suitable means for suspending sphere 86 can be utilized, such as a U-bracket 89, with open end 91 facing toward housing end 16′, secured at one side 92 to the outer wall of housing 16, with the opposite side 93 extending sufficiently from housing end 16′ to contain support point 87. Suspension cord 88 is secured at one end to bracket side 93, at point 87 and at the other end to sphere 86 by any suitable nut type fastener means 95 and 94 respectively.

In the operation of the sphere closure of FIG. 7, the operator, during the nonloading period with concurrently continued operation of the water pumping system, guides the ball member into peripheral closing relationship with port A′, and the force of suction draws the sphere into closing position with the port opening to terminate air flow into the port and thereby preclude flow of air to the underwater shooting site. When loading is to be resumed, the operator grasps the ball member away from the port to open the port for sequential loading of the charges. The sphere handling cycle is then repeated to close the port during nonloading and to open it for loading without the need for terminating operation of the water pumping system. What I claim and desire to protect by Letters Patent is:

I claim:

1. A device for loading seismic explosive charges for delivery to an underwater shooting site comprising a housing; a passageway extending through said housing for successively conveying said charges, and said passageway having a constricted cross section along part of its length, as a throat portion; a section of said passageway diverging from said throat portion; and means for conveying fluid into said throat portion and for passing same through said throat portion under high velocity conditions in a direction toward said diverging section.

2. In a loading device of claim 1, said diverging section constituting an end portion of said passageway.

3. In a loading device of claim 2, said throat portion disposed intermediate the ends of said passageway, and an opposite end section of said passageway extending from said throat portion as a port section for receiving said charges for delivery into said throat.

4. A loading device of claim 3 wherein said port section diverges along at least part of its length from said throat portion.

5. In a loader device of claim 4, at least one conduit opening through a sidewall of said housing into direct fluidtight communication with said throat portion, as said means for conveying said high velocity fluid.

6. In a loader device of claim 5, a plurality of said conduits opening into said throat at points spaced along a peripheral path on the inner wall of said housing.

7. In a device of claim 6, a pair of said conduits for conveying fluid into said throat portion, opening into said throat at substantially equal-spaced points.

8. In a loading assembly of claim 5, a bushing member coaxially within said housing at the port end thereof in fluidtight relationship with the inner housing wall, and forming said port section; said throat portion being formed by separate parts including, as a first part, a section of said constricted cross section adjacent said diverging end section; a collar member annularly extending within said passageway from said bushing in fluidtight relationship therewith, in axial alignment with said first throat section as the remaining part of said cross section but short of direct contact therewith, thereby forming an open unobstructed channelway into said throat portion from the entire annulus formed around said collar.

9. In a loader assembly of claim 8, said bushing and collar member constituting an integral unit of construction, at least one of said conduits opening into said annulus, and means for moving said unit axially within said housing for adjustment of the dimension of said unobstructed passageway.

10. A system for loading seismic charges for delivery to an underwater firing station which comprises a charge loading station remote from said firing station, and a seismic explosive charge loader assembly at said loading station; said loader assembly comprising (1) a housing, (2) a passageway extending through said housing for successively conveying said charges, and said passageway having a constricted cross section along part of its length, as a throat portion, (3) a section of said passageway diverging from said throat portion, (4) means for conveying fluid into said throat portion and to passing same through said throat portion under high velocity flow conditions in a direction toward said diverging section, and (5) means for communicating said passageway through said diverging section with conduit means for delivering explosive charges from said loader assembly to said firing station; and means for delivering water, as said fluid, through said conveying means for said flow through said throat.

11. A system of claim 10 wherein said diverging section constitutes an end portion of said passageway; said throat portion is disposed intermediate the ends of said passageway; an opposite end section of said passageway extends from said throat portion as a port section for receiving said charges for delivery into said throat; and at least one conduit opening through a sidewall of said housing into direct fluidtight communication with said throat portion, as means for conveying said high velocity fluid.

12. In a system of claim 11, a bushing member coaxially within said housing at the port end thereof in fluidtight relationship with the inner housing wall, and forming said port section; said throat portion being formed by separate parts including, as a first part, a section of said constricted cross section adjacent said diverging end section; a collar member annularly extending within said passageway from said bushing in fluidtight relationship therewith, in axial alignment with said first throat section as the remaining part of said cross section but short of direct contact therewith, thereby forming an open unobstructed channelway into said throat portion from the entire annulus formed around said collar, and at least one of said conduits opening into said annulus.

13. A method for sequentially loading seismic explosive charges at a charge loading station for delivery to an underwater seismic shooting site, which comprises pumping water from a marine area at high velocity through a throat-way supported at said station in direct communication at one end with atmospheric air, and then passing said water into and through a diverging zone of expansion, whereby the pressure in said throat becomes less than that of the surrounding atmospheric air and air is drawn from the adjacent atmosphere into said throat through said open end; sequentially inserting said charges from the adjacent air atmosphere into said open end of said throat-way, whereby said charges are moved into an initial zone in said throat-way by force of air drawn from the adjacent air atmosphere and then through the remainder of said throat-way and through said diverging zone under combined force of atmospheric pressure and impinging force of said water for delivery, entrained in said water, to said shooting site.

14. In a method of claim 13, pumping said water into an intermediate zone in said throat-way and then passing said water through the remainder of said throat-way for travel through said diverging zone.

15. In a method of claim 14, pumping said water into said throat-way at a plurality of points.

16. In a method of claim 15 pumping said water into said throat-way at a plurality of substantially equispaced points.

17. A system for generating seismic energy in an underwater seismic test area utilizing small explosive charges as the seismic energy source, comprising a submersed firing station for firing said charges; a seismic charge loader device remote from said firing station and comprising (1) a housing (2) a passageway extending through said housing for successively conveying said charges, and said passageway having a constricted cross section along part of its length, as a throat portion, (3) a section of said passageway diverging from said throat portion, and (4) means for conveying fluid into said throat portion and for passing same through said throat portion under high velocity flow conditions in a direction toward said diverging section; means for delivering fluid through said conveying means for said high velocity flow; conduit means connecting the diverged end of said diverging section of said passageway with said firing station for conveying said charges from said loader device to said firing station; and means at said firing station, for firing said charges to provide said seismic energy.

18. In a system of claim 17 means for measuring said seismic energy for a seismic record.

19. A method for sequentially loading seismic explosive charges at a charge loading station in a marine area and delivery of the charges to an underwater shooting site and firing same to provide seismic energy which comprises pumping water from the marine area at high velocity through a throat-way supported at said station in direct communication at one end with atmospheric air, and then passing said water into and through a diverging zone of expansion, whereby the pressure in said throat becomes less than that of the surrounding atmospheric air and air is drawn from the adjacent atmosphere into said throat through said open end; sequentially inserting said charges from the adjacent air atmosphere into said open end of said throat-way, whereby said charges are moved into an initial zone in said throat-way by force of air drawn from the adjacent air atmosphere and then through the remainder of said throat-way and through said diverging zone under combined force of atmospheric pressure and impinging force of said water for delivery, entrained in said water, to said shooting site; delivering said charges from said diverging zone to said shooting site, and then firing said charges to provide said seismic energy.

20. In a method of claim 19 measuring said seismic disturbances to provide a seismic record.

21. In a device of claim 1, means for closing said passageway at the end thereof opposite said diverging section, during a nonloading period, in response to force of suction generated by said passing of fluid through said throat section.

22. In a device of claim 21, an elastomeric sphere, as said closing means, outside said housing and facing a circular port inlet of said passageway, and having a diametric cross section greater than that of said port inlet; and said sphere suspended so as to travel along an arc with the point of suspension as the center, into and from peripheral closing contact relationship with said port inlet.

PO-1050
(5/69)

UNITED STATES PATENT OFFICE
CERTIFICATE OF CORRECTION

Patent No. __U.S.P. 3,578,101__ Dated __May 11, 1971__

Inventor(s) __Richard R. Larson (Case 2-3)__

It is certified that error appears in the above-identified patent and that said Letters Patent are hereby corrected as shown below:

Col. 1, Line 55 & 56 of p.p.; Page 3, Line 16 of spec.

"and now Pat. No. 3,509,820" should appear after second occurence of "April 21, 1969"

Signed and sealed this 31st day of August 1971.

(SEAL)
Attest:

EDWARD M. FLETCHER, JR.
Attesting Officer

WILLIAM E. SCHUYLER, JR.
Commissioner of Patents